United States Patent
Singh

(10) Patent No.: US 10,746,264 B2
(45) Date of Patent: Aug. 18, 2020

(54) ROTARY TENSIONER

(71) Applicant: GATES CORPORATION, Denver, CO (US)

(72) Inventor: Sukhdeep Singh, Lasalle (CA)

(73) Assignee: Gates Corporation, Denver, CO (US)

(*) Notice: Subject to any disclaimer, the term of this patent is extended or adjusted under 35 U.S.C. 154(b) by 67 days.

(21) Appl. No.: 15/815,408

(22) Filed: Nov. 16, 2017

(65) Prior Publication Data
US 2019/0145501 A1    May 16, 2019

(51) Int. Cl.
*F16H 7/12*    (2006.01)
*F16H 7/08*    (2006.01)

(52) U.S. Cl.
CPC ............. *F16H 7/1281* (2013.01); *F16H 7/08* (2013.01); *F16H 7/1218* (2013.01); *F16H 2007/081* (2013.01); *F16H 2007/0842* (2013.01); *F16H 2007/0863* (2013.01); *F16H 2007/0865* (2013.01); *F16H 2007/0874* (2013.01); *F16H 2007/0893* (2013.01)

(58) Field of Classification Search
CPC .................. F16H 7/1281; F16H 7/1218; F16H 2007/081; F16H 2007/0842; F16H 2007/0865; F16H 2007/0893; F16H 2007/0874; F16H 7/08; F16H 2007/0863
See application file for complete search history.

(56) References Cited

U.S. PATENT DOCUMENTS

| | | | |
|---|---|---|---|
| 315,735 A | 4/1885 | Colburn | |
| 976,115 A | 11/1910 | Bard | |
| 1,433,958 A | 10/1922 | Laughton | |
| 1,805,326 A | 5/1931 | Bunker et al. | |
| 2,954,726 A | 10/1960 | Kerridge | |
| 4,564,098 A | 1/1986 | Hoermann | |
| 4,698,049 A | 10/1987 | Bytzek et al. | |
| 4,758,208 A | 7/1988 | Bartos et al. | |
| 4,981,116 A | 1/1991 | Trinquard | |

(Continued)

FOREIGN PATENT DOCUMENTS

| | | |
|---|---|---|
| DE | 508156 C | 9/1930 |
| DE | 19631507 A1 | 2/1998 |

(Continued)

OTHER PUBLICATIONS

European Patent Office, International Search Report and Written Opinion of the International Searching Authority, International application No. PCT/US2018/061088, dated Jan. 25, 2019.

*Primary Examiner* — Michael R Mansen
*Assistant Examiner* — Raveen J Dias
(74) *Attorney, Agent, or Firm* — Paul N. Dunlap, Esq.

(57) ABSTRACT

A tensioner comprising a base having a base aperture, the base aperture having an axis A-A and capable of receiving a driven component, a rotary arm rotatably engaged with the base and encircling the base aperture, a swing arm pivotally engaged with the rotary arm, a first torsion spring biasing the swing arm, a first pulley journalled to the swing arm, a rotary ring rotatably encircling the base aperture and disposed between the rotary arm and the base, a second pulley journalled to the rotary ring, a second torsion spring engaged between the rotary ring and the rotary arm for biasing the rotary ring, and a wave spring in pressing engagement between the base and the rotary ring.

12 Claims, 5 Drawing Sheets

(56) References Cited

U.S. PATENT DOCUMENTS

| | | | |
|---|---|---|---|
| 5,221,236 A | 6/1993 | Raymer | |
| 5,725,450 A | 3/1998 | Huskey et al. | |
| 5,776,025 A | 7/1998 | Labudde et al. | |
| 6,117,034 A | 9/2000 | Vine | |
| 6,511,393 B1 | 1/2003 | Bogl et al. | |
| 6,609,989 B2 | 8/2003 | Bogner et al. | |
| 6,648,783 B1 | 11/2003 | Bogner | |
| 6,689,001 B2 | 2/2004 | Oliver et al. | |
| 6,736,743 B2 | 5/2004 | Fletcher et al. | |
| 6,830,524 B2 | 12/2004 | Tamai | |
| 6,857,978 B2 | 2/2005 | Polster et al. | |
| 6,960,145 B2 | 11/2005 | Fraley, Jr. et al. | |
| 7,468,013 B2 | 12/2008 | Di Giacomo et al. | |
| 7,494,434 B2 | 2/2009 | Mc Vicar et al. | |
| 7,530,911 B2 | 5/2009 | Serkh | |
| 7,892,125 B2 | 2/2011 | Nelson et al. | |
| 7,901,310 B2 | 3/2011 | Lolli et al. | |
| 8,092,328 B2 | 1/2012 | Dec et al. | |
| 8,353,795 B2 | 1/2013 | Montani et al. | |
| 8,439,780 B2 | 5/2013 | Ruffini et al. | |
| 8,821,328 B2 | 9/2014 | Jud et al. | |
| 9,890,837 B1* | 2/2018 | Martinez | F16H 7/0831 |
| 2002/0039943 A1 | 4/2002 | Serkh | |
| 2002/0039944 A1* | 4/2002 | Ali | F16H 7/1209 |
| | | | 474/135 |
| 2002/0086751 A1 | 7/2002 | Bogner et al. | |
| 2003/0109342 A1* | 6/2003 | Oliver | F16H 7/1281 |
| | | | 474/134 |
| 2003/0153420 A1 | 8/2003 | Rogers | |
| 2003/0153421 A1 | 8/2003 | Liu | |
| 2003/0176249 A1 | 9/2003 | Polster et al. | |
| 2003/0216203 A1 | 11/2003 | Oliver et al. | |
| 2003/0220164 A1 | 11/2003 | Tamai | |
| 2004/0002401 A1 | 1/2004 | Iverson | |
| 2004/0043854 A1 | 3/2004 | Fraley, Jr. et al. | |
| 2004/0072642 A1 | 4/2004 | Serkh | |
| 2004/0077446 A1 | 4/2004 | Manning | |
| 2004/0087401 A1 | 5/2004 | Serkh | |
| 2005/0096168 A1 | 5/2005 | Serkh et al. | |
| 2005/0181901 A1 | 8/2005 | Shin et al. | |
| 2006/0100051 A1 | 5/2006 | Di Giacomo et al. | |
| 2006/0217222 A1 | 9/2006 | Lolli et al. | |
| 2006/0287146 A1 | 12/2006 | McVicar et al. | |
| 2007/0037648 A1 | 2/2007 | Di Giacomo | |
| 2008/0214342 A1 | 9/2008 | Montani et al. | |
| 2008/0220919 A1 | 9/2008 | Antchak et al. | |
| 2012/0318589 A1 | 12/2012 | Staley et al. | |
| 2013/0040770 A1 | 2/2013 | Wolf et al. | |
| 2013/0079185 A1 | 3/2013 | Schauerte et al. | |
| 2013/0095967 A1* | 4/2013 | Wolf | F16H 7/1281 |
| | | | 474/135 |
| 2013/0203535 A1 | 8/2013 | Mack et al. | |
| 2013/0260932 A1 | 10/2013 | Adam et al. | |
| 2014/0315673 A1* | 10/2014 | Zacker | F16H 7/1218 |
| | | | 474/135 |
| 2015/0247557 A1* | 9/2015 | Lindstrom | F16H 7/12 |
| | | | 474/135 |
| 2015/0308545 A1 | 10/2015 | Harvey et al. | |
| 2015/0345597 A1* | 12/2015 | Walter | F16H 7/1218 |
| | | | 474/134 |
| 2016/0146312 A1* | 5/2016 | Pfeifer | F16H 7/1281 |
| | | | 474/135 |
| 2017/0146100 A1* | 5/2017 | Walter | F02B 67/06 |
| 2018/0010670 A1* | 1/2018 | Leucht | F16H 7/0838 |
| 2019/0017579 A1* | 1/2019 | Stadermann | F16H 7/12 |
| 2019/0078667 A1* | 3/2019 | Liu | F16H 7/0829 |
| 2019/0285147 A1* | 9/2019 | Singh | F16H 7/1218 |

FOREIGN PATENT DOCUMENTS

| | | |
|---|---|---|
| DE | 10044645 A1 | 3/2002 |
| DE | 102011085122 A1 | 4/2013 |
| EP | 2128489 B1 | 8/2011 |
| EP | 2385272 A1 | 11/2011 |
| JP | 03028551 A | 2/1991 |
| WO | 2013142951 A1 | 10/2013 |
| WO | 2014100894 A1 | 7/2014 |
| WO | 2015196268 A1 | 12/2015 |

* cited by examiner

ROTARY TENSIONER

FIELD OF THE INVENTION

The invention relates to a tensioner, and more particularly, to a rotary tensioner having a first torsion spring in a swing arm on a rotary arm, and a second torsion spring biasing a rotary ring and the rotary arm.

BACKGROUND OF THE INVENTION

Most internal combustion engines comprise accessories such as power steering, an alternator and air conditioning to name a few. These accessories are typically driven by a belt. A tensioner is typically used to apply a preload to the belt in order to prevent slippage. The tensioner can be mounted to an engine mounting surface.

The engine may further comprise a start-stop system whereby the engine will shut down when the vehicle is not in motion, and when a driver command is received to proceed the engine will restart.

The start-stop function will tend to reverse loading on the belt. Hence, tensioners are available to accommodate belt load reversals. The tensioner may comprise one or more components which independently pivot in order to properly apply a required belt preload force in both belt drive directions. The tensioner may also be mounted directly to an accessory such as an alternator in order to save space in the engine bay.

Representative of the art is WO2014/100894 which discloses a tensioner for tensioning an endless drive member that is engaged with a rotary drive member on a shaft of a motive device. The tensioner includes a base that is mountable to the motive device, a ring that is rotatably supported by the base in surrounding relationship with the shaft of the motive device and which is rotatable about a ring axis, a tensioner arm pivotally mounted to the ring for pivotal movement about an arm pivot axis, and first and second tensioner pulleys. The first tensioner pulley is rotatably mounted to the tensioner arm. The tensioner arm is biased towards a first span of the endless drive member on one side of the rotary drive member. The second tensioner pulley is rotatably mounted at least indirectly to the ring and is biased towards a second span of the endless drive member on another side of the rotary drive member. The ring is rotatable in response to hub loads in the first and second tensioner pulleys that result from engagement with the first and second spans of the endless drive member.

What is needed is a rotary tensioner having a first torsion spring in a swing arm on a rotary arm, and a second torsion spring biasing a rotary ring and the rotary arm. The present invention meets this need.

SUMMARY OF THE INVENTION

The primary aspect of the invention is to provide a rotary tensioner having a first torsion spring in a swing arm on a rotary arm, and a second torsion spring biasing a rotary ring and the rotary arm.

Other aspects of the invention will be pointed out or made obvious by the following description of the invention and the accompanying drawings.

The invention comprises a tensioner comprising a base having a base aperture, the base aperture having an axis A-A and capable of receiving a driven component, a rotary arm rotatably engaged with the base and encircling the base aperture, a swing arm pivotally engaged with the rotary arm, a first torsion spring biasing the swing arm, a first pulley journalled to the swing arm, a rotary ring rotatably encircling the base aperture and disposed between the rotary arm and the base, a second pulley journalled to the rotary ring, a second torsion spring engaged between the rotary ring and the rotary arm for biasing the rotary ring, and a wave spring in pressing engagement between the base and the rotary ring.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
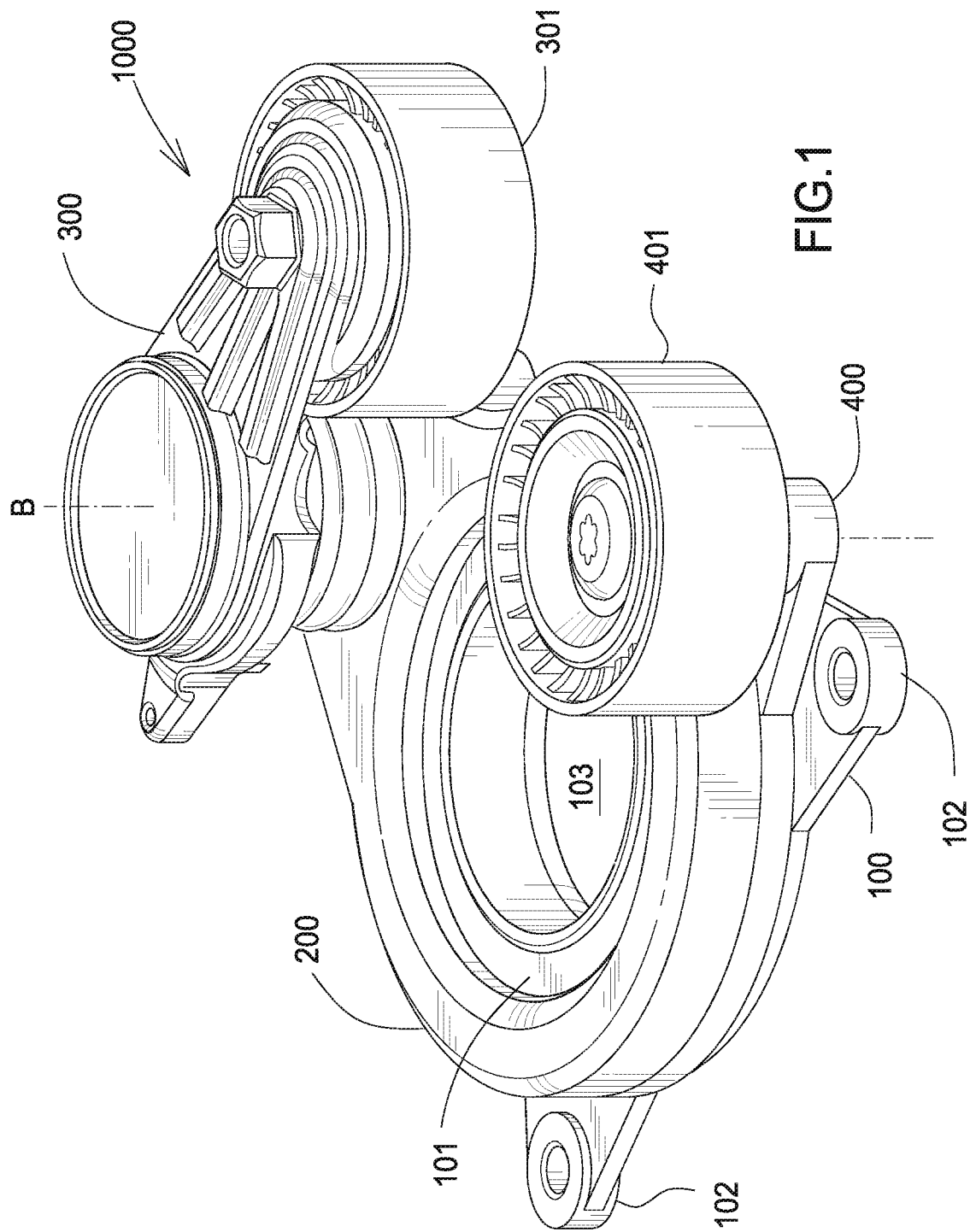
FIG. 1 is a top perspective view.

FIG. 1 is a top perspective view. Rotary tensioner 1000 comprises a base 100, rotary arm 200, rotary ring 400 and a swing arm tensioner 300. Rotary tensioner 1000 has a generally circular form to accommodate installation on a belt driven machine (BDM). Base 100 is used to mount the inventive device to a belt driven machine such as an alternator, starter generator or motor generator unit. Such units are typically used in so-called engine start-stop applications. A driven shaft pulley P of the BDM projects through base aperture 103. Mounting portions 102 receive fasteners such as bolts or screws to attach the tensioner 1000 to the BDM.

Rotary arm 200 is rotatably engaged with base 100. Retaining ring 101 retains rotary arm 200 on base 100. Retaining ring 101 may be press fit or clamped to base 100. Rotary arm 200 is rotatable about base aperture 103 on axis A-A.

Tensioner swing arm 300 is pivotally mounted to rotary arm 200 on an axis B-B. Pulley 301 is journalled to pivot arm 300. Torsion spring 600 biases pivot arm 300 toward pulley 401 and into engagement with a drive belt (not shown), thereby applying a belt load. Torsion spring 600 is loaded in the unwinding direction.

Rotary ring 400 is rotatably engaged between rotary arm 200 and base 100. Rotary ring 400 is rotatable about axis A-A and base aperture 103. Pulley 401 is journalled to rotary ring 400.

Torsion spring 500 is engaged between the rotary arm 200 and rotary ring 400. Torsion spring 500 is loaded in the unwinding direction. Torsion spring 500 causes pulley 401 to resist the force exerted by torsion spring 600 through pulley 301. Torsion spring 500 is enclosed in part within rotary arm 200 and rotary ring 400.

The use of two torsion springs (500, 600) divides the significant rotational requirements and torque requirements of this tensioner in its intended service, thereby ensuring proper performance. The intended service can include use in the accessory belt drive for a start-stop engine configuration.

Figure 2:
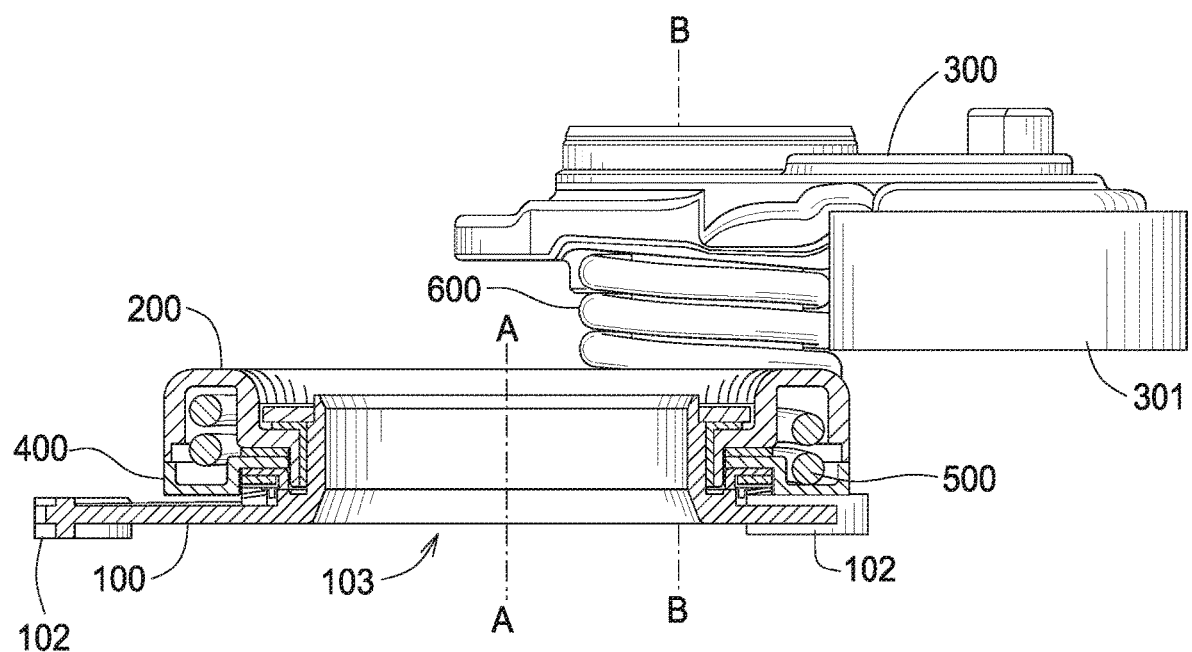
FIG. 2 is a cross sectional view.

FIG. 2 is a cross sectional view. A shaft pulley P of the BDM extends through base aperture 103 along axis A-A such that a drive belt B will engage pulley P on a BDM shaft as well as pulley 301 and pulley 401.

Pivot axis B-B of swing arm 300 is disposed radially from and is not coaxial with axis A-A. Pivot axis B-B is disposed outside the base aperture 103.

Figure 3:
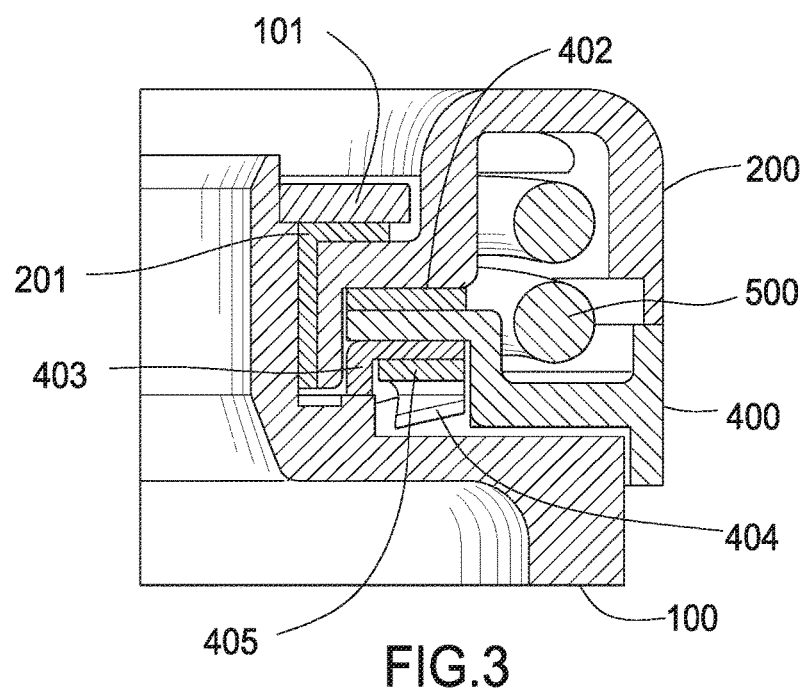
FIG. 3 is a cross sectional detail of FIG. 2.

FIG. 3 is a cross sectional detail of FIG. 2. Damping band 402 and damping band 403 frictionally engage with and damp oscillatory movements of rotary arm 200 and rotary ring 400. Damping band 402 and 403 comprise frictional materials known in the tensioner damping arts. A wave style spring 404 presses the stack comprising damping band 403, rotary ring 400, damping band 402, rotary arm 200 and bushing 201 into contact with retaining ring 101, thereby providing a normal force necessary to generate frictional damping forces. Spring 404 bears upon base 100. Low-friction bushing 201 facilitates relative movement of rotary arm 200 with respect to base 100. Bushing 201 locates rotary arm 200 and rotary ring 400 with respect to base aperture 103.

Figure 4:
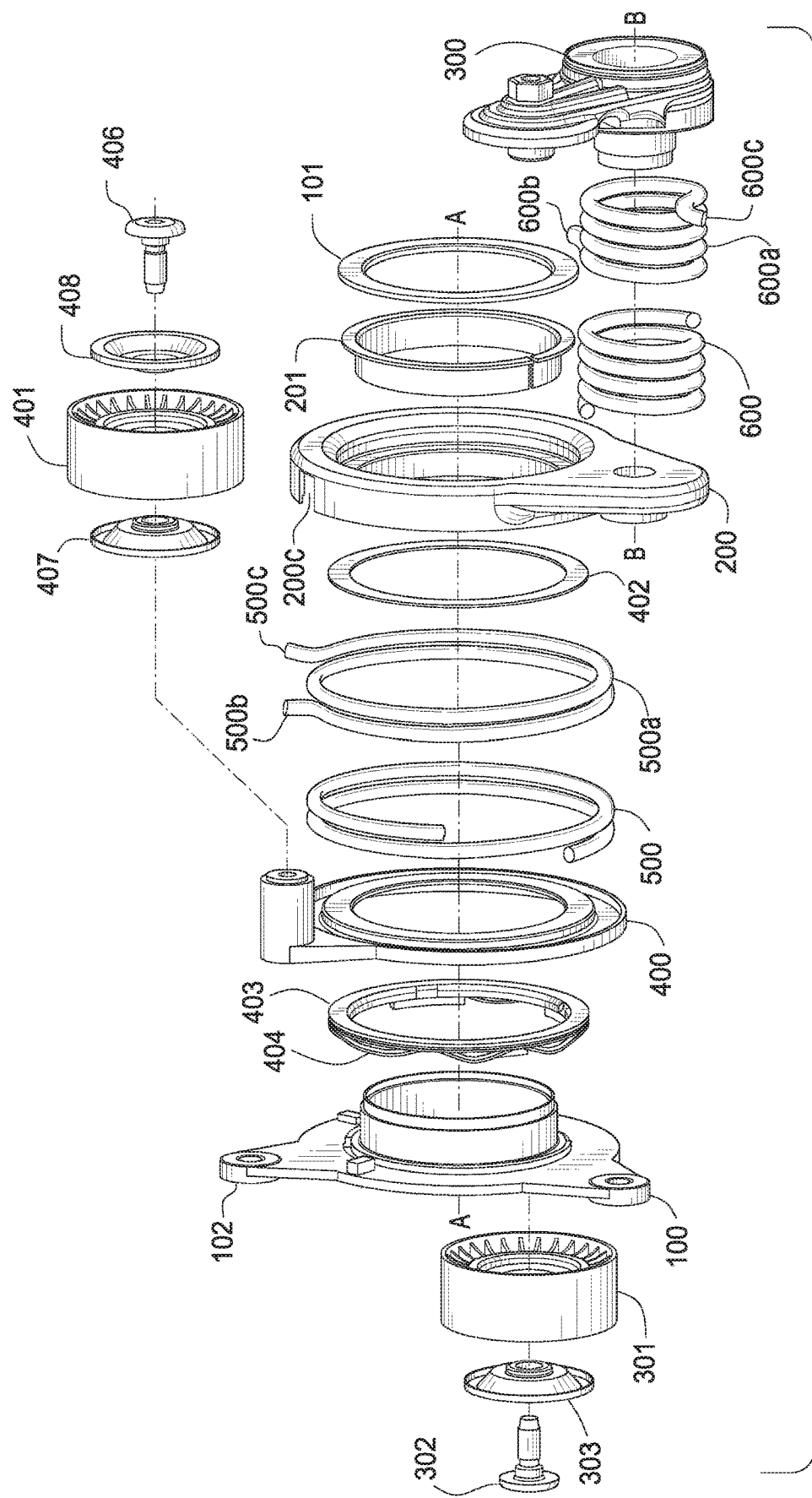
FIG. 4 is an exploded view.

FIG. 4 is an exploded view. Pulley 301 is fastened to swing arm 300 by a bolt 302. Pulley 401 is fastened to rotary ring 400 by a bolt 406. Dust cover 407 and dust cover 408 prevent debris from entering a pulley bearing. Dust cover 303 prevents debris from entering a pulley bearing.

Two springs are depicted in FIG. 4 wherein the tensioner can be made to operate in either a spring unwinding under load or spring winding under load. In the spring unwinding to load mode, spring 500 and spring 600 is used. Each spring 500 and spring 600 is loaded in a spring unwinding direction. Spring 500 engages rotary ring 400 and rotary arm 200. Spring 600 engages rotary arm 200 and swing arm 300.

In an alternate embodiment spring 500 and 600 can be loaded in a winding direction. In the winding direction embodiment spring 500a and spring 600a each replace spring 500 and spring 600 respectively.

Spring 500a comprises a tab 500b and 500c extending therefrom. Tab 500b engages rotary ring 400 and tab 500c engages rotary arm slot 200c. Spring 600 comprises a tab 600b and 600c extending therefrom. Tab 600b engages rotary arm 200 and tab 600c engages swing arm 300.

In yet another embodiment, an unwinding spring 500 or 600 may be used with a winding spring 500a or 600a. For example, spring 500 with spring 600a, or spring 500a with spring 600 depending on the needs of a user.

Figure 5:
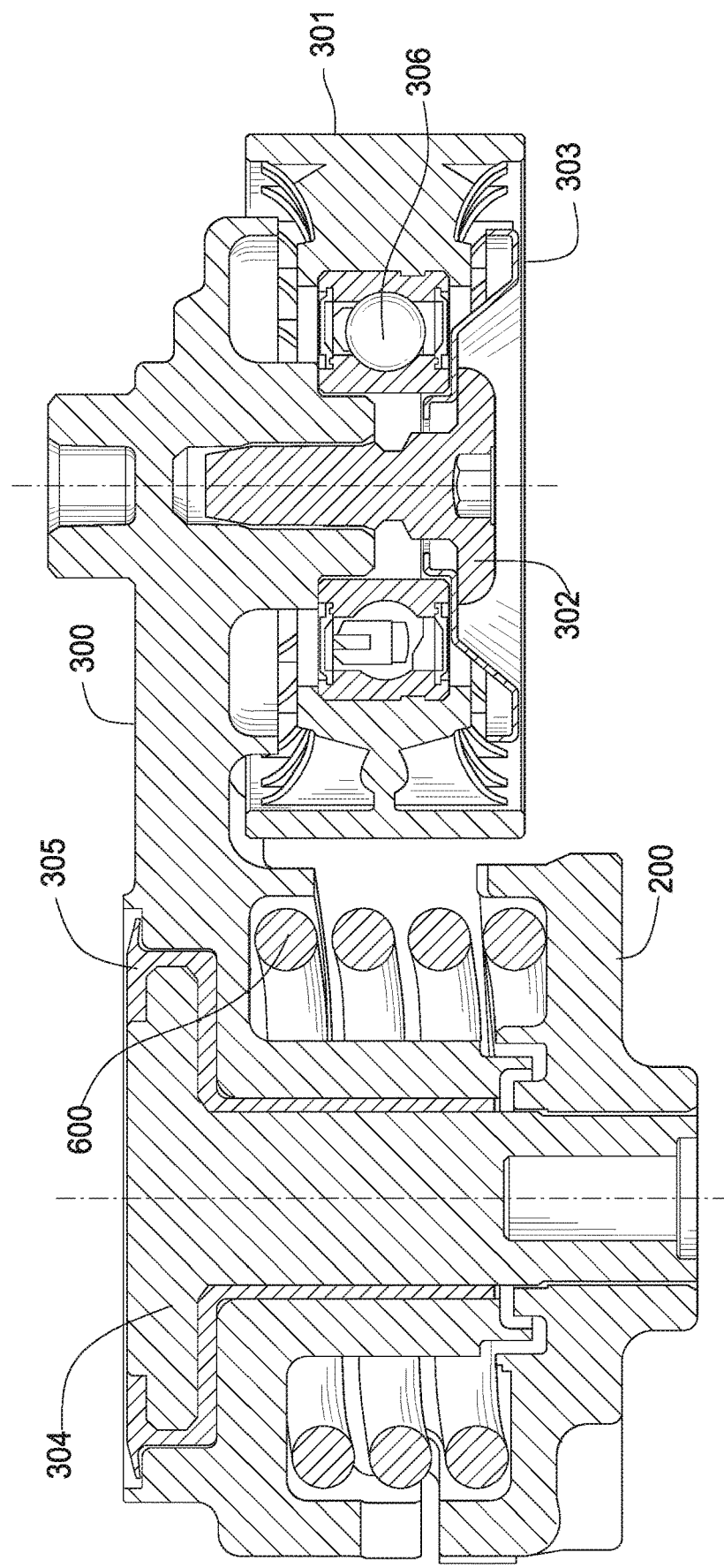
FIG. 5 is a cross section of the swing arm tensioner.

FIG. 5 is a cross section of the swing arm tensioner. Swing arm 300 pivots about shaft 304. Shaft 304 is fixed to rotary arm 200. Low-friction bushing 305 facilitates movement of swing arm 300 on shaft 304. Pulley 301 is journalled on a bearing 306 to shaft 304.

Figure 6:
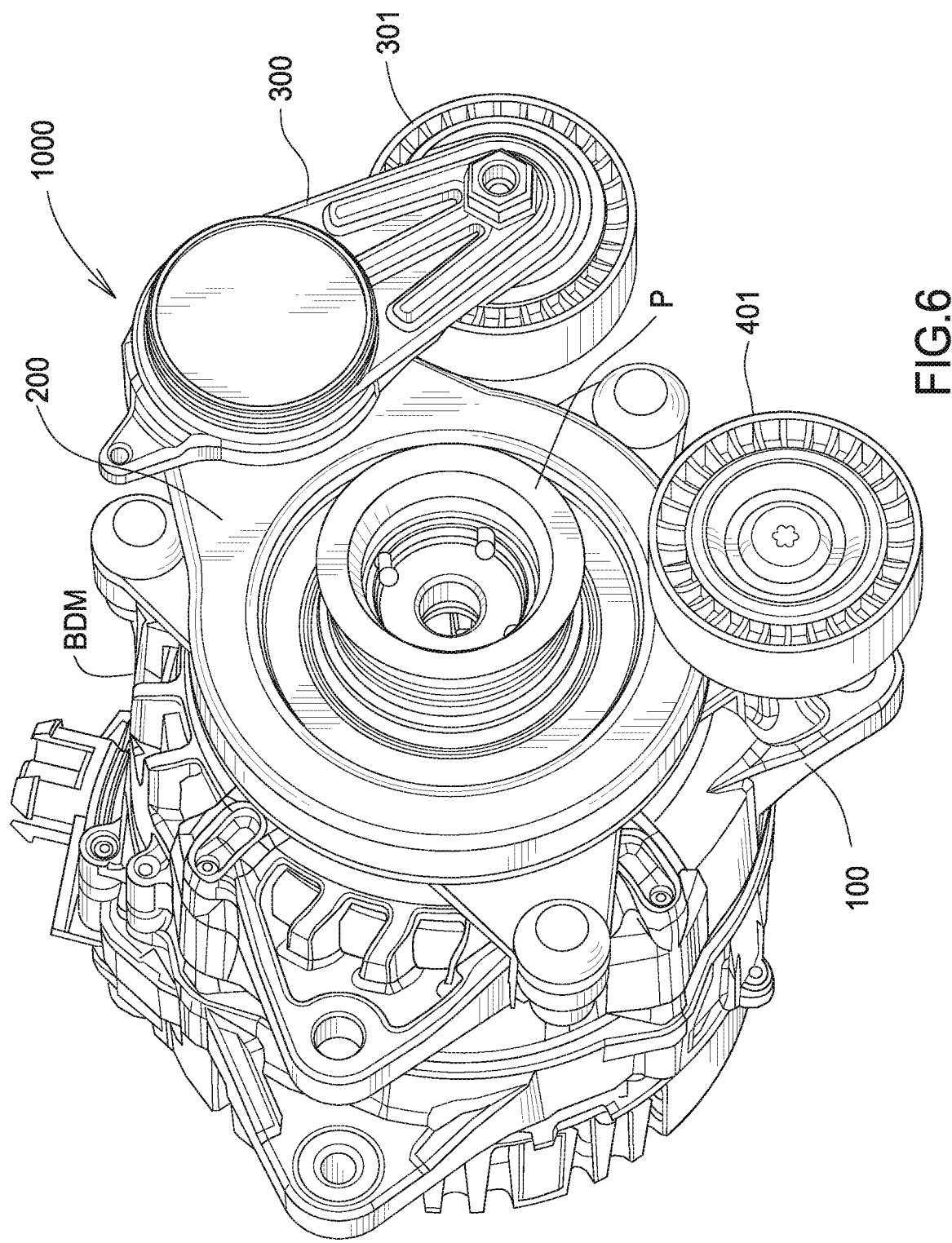
FIG. 6 is a perspective view of the device on a driven machine.

FIG. 6 is a perspective view of the device on a driven machine. The driven pulley P of the BDM projects into and through base aperture 103. The BDM is typically mounted to a vehicle engine and is driven by a drive belt B. Belt B engages pulley P, pulley 301 and pulley 401.

Although a form of the invention has been described herein, it will be obvious to those skilled in the art that variations may be made in the construction and relation of parts and method without departing from the spirit and scope of the invention described herein.

I claim:

1. A tensioner comprising:
   a base having a base aperture, the base aperture having an axis A-A and capable of receiving a driven component;
   a rotary arm rotatably engaged with the base and encircling the base aperture;
   a swing arm pivotally engaged with the rotary arm and having a pivot axis B-B, a first torsion spring biasing the swing arm, a first pulley journalled to the swing arm;
   a rotary ring rotatably encircling the base aperture and disposed between the rotary arm and the base, a second pulley journalled to the rotary ring;
   a second torsion spring engaged between the rotary ring and the rotary arm for biasing the rotary ring; and
   a wave spring in pressing engagement between the base and the rotary ring.

2. The tensioner as in claim 1, wherein the rotary arm and the rotary ring coaxially rotate about the axis A-A.

3. The tensioner as in claim 1, wherein the driven component rotates on the axis A-A.

4. The tensioner as in claim 1, wherein the first torsion spring is loaded in an unwinding direction to bias the swing arm towards the second pulley.

5. The tensioner as in claim 1, wherein the second torsion spring is loaded in an unwinding direction to bias the second pulley towards the first pulley.

6. The tensioner as in claim 1 further comprising a damping member in frictional engagement with the rotary arm and the rotary ring.

7. The tensioner as in claim 1, wherein the base is fixedly attachable to a driven component.

8. The tensioner as in claim 1, wherein the pivot axis B-B of the swing arm is disposed radially from the axis A-A.

9. The tensioner as in claim 1, wherein the pivot axis B-B is disposed outside of the base aperture.

10. The tensioner as in claim 1, wherein the rotary arm is retained by a retaining member attached to the base.

11. The tensioner as in claim 1, wherein the first torsion spring is loaded in a winding direction to bias the swing arm towards the second pulley.

12. The tensioner as in claim 1, wherein the second torsion spring is loaded in a winding direction to bias the second pulley towards the first pulley.

* * * * *